United States Patent
Hsiao et al.

(10) Patent No.: US 7,123,842 B2
(45) Date of Patent: Oct. 17, 2006

(54) ULTRASONIC AND INFRARED TRANSMITTER WITH TUNABLE CARRIER FREQUENCY

(75) Inventors: Chun-Yang Hsiao, Hsinchu (TW); Shui-Po Ho, Hsinchu (TW)

(73) Assignee: Elan Microelectronics Corporation, Hsinchu (TW)

( * ) Notice: Subject to any disclaimer, the term of this patent is extended or adjusted under 35 U.S.C. 154(b) by 686 days.

(21) Appl. No.: 09/990,273

(22) Filed: Nov. 23, 2001

(65) Prior Publication Data

US 2002/0067531 A1  Jun. 6, 2002

(30) Foreign Application Priority Data

Dec. 5, 2000  (TW) ............... 89221130 U

(51) Int. Cl.
  *H04B 10/04* (2006.01)
  *H04B 11/00* (2006.01)
(52) U.S. Cl. .............. 398/182; 398/183; 367/137
(58) Field of Classification Search ........... 398/202, 398/168–169, 182–183; 375/288; 332/148, 332/154; 367/137
See application file for complete search history.

(56) References Cited

U.S. PATENT DOCUMENTS 5,155,614 A * 10/1992 Carmen et al. ............ 398/202
6,617,937 B1 * 9/2003 Jue et al. .................... 332/109

FOREIGN PATENT DOCUMENTS

DE       154758 A  *  4/1982
JP       06197149 A *  7/1994

OTHER PUBLICATIONS

"From push-pull circuit to push-pull voltages." IEEE Standard Dictionary of Electrical and Electronics Terms. 3rd ed. 1984.*
"Octal bus buffer with 3 state outputs HC 540: inverted—HC 541 non inverted." SGS-Thomson Microelectronics (Oct. 1993): 12 pp. Dec. 28, 2004 <http://mc.ict.tuwien.ac.al/uebungsteil/projekte/ED1/Logic/74HC541.PDF>.*

* cited by examiner

*Primary Examiner*—Kenneth Vanderpuye
*Assistant Examiner*—David S. Kim
(74) *Attorney, Agent, or Firm*—Rosenberg, Klein & Lee

(57) ABSTRACT

The present invention discloses an ultrasonic and infrared transmitter with tunable carrier frequency, which comprises an oscillation frequency, a frequency divider, a multiplexer and an output buffer on an integrated circuit in association with an infrared light emitting diode or ultrasonic transducer to transmit infrared or ultrasonic carrier signals. The oscillation frequency is divided by the frequency divider and sent to one input of the multiplexer which has the other input connected with a user-controlled data, and finally the output buffer outputs the data. The integrated circuit provides two carrier signal output ports, and the carrier signals from these two output ports are inverted to each other, thus the described apparatus can transmit not only infrared carrier signal but also ultrasonic carrier signal.

2 Claims, 5 Drawing Sheets

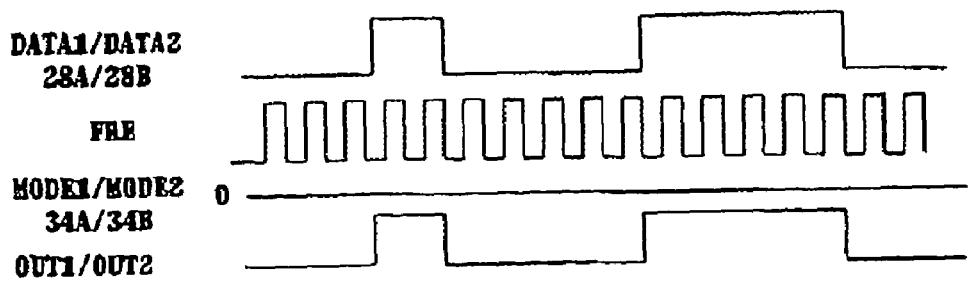
Fig. 5(A)
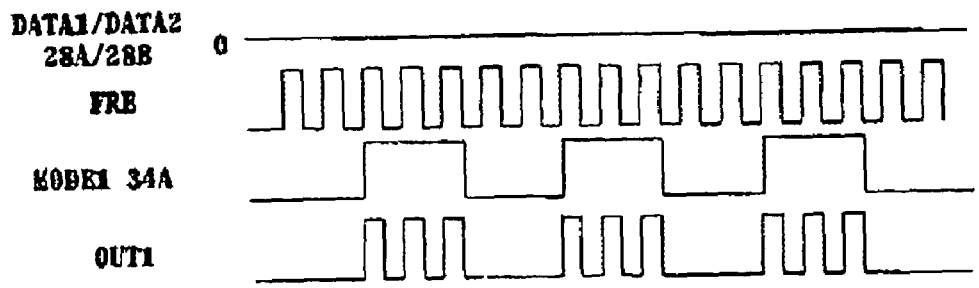
Fig. 5(B)
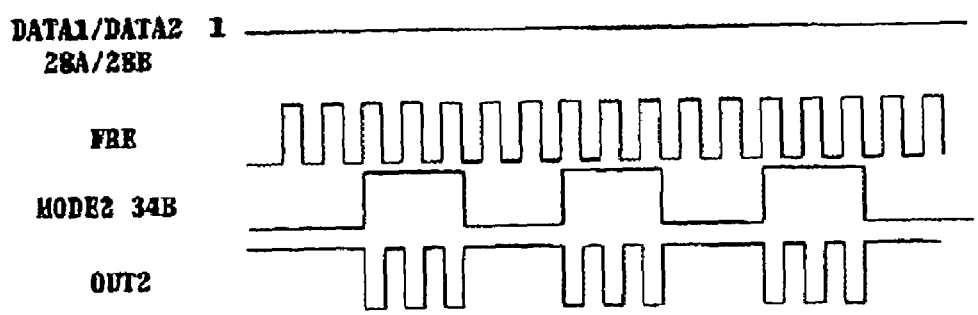
Fig. 5(C)
Fig. 5

ULTRASONIC AND INFRARED TRANSMITTER WITH TUNABLE CARRIER FREQUENCY

FIELD OF THE INVENTION

The present invention relates generally to a wireless carrier signal generator, and more specifically, to an ultrasonic and infrared transmitter with tunable carrier frequency.

BACKGROUND OF THE INVENTION

In the prior art, for wireless communications by infrared and ultrasonic transmitters, the infrared and ultrasonic carrier signals are generated in different ways, for instance by oscillators. However, the frequency of the carrier generated this way needs to be adjusted and thus inconvenient for utilization. FIG. 1 shows the circuit diagram of a conventional carrier signal generator for infrared or ultrasonic transmission, in which the output of an integrated circuit 10 is connected to a complicated carrier generator 13 and an infrared light emitting diode (LED) or ultrasonic transducer 12, the carrier generator 13 for production of the carrier signal for infrared or ultrasonic output and the infrared LIGHT EMITTING DIODE or ultrasonic transducer 12 for transmission of the carrier signal. However, the frequency characteristics of the infrared LIGHT EMITTING DIODE and the ultrasonic transducer are different, once one transmission type has been determined, for example the ultrasonic one, the circuit must be modified to switch to the other transmission type. Therefore, the user has to choose the transmission type first and then design the circuit for producing the carrier, and thus it is more difficult to design the circuit.

Due to the shortcomings of the prior arts, it is desired an ultrasonic and infrared transmitter with tunable carrier frequency.

SUMMARY OF THE INVENTION

One object of the present invention is to provide an ultrasonic and infrared transmitter with tunable carrier frequency, which is applicable to infrared LIGHT EMITTING DIODE and ultrasonic transducer of different carrier frequencies, and also enables the ultrasonic transducer to transmit signals of variable intensity and avoid interferences from environmental noises. According to the present invention, an ultrasonic and infrared transmitter with tunable carrier frequency comprises a frequency divider, multiplexers, output buffers and an infrared LIGHT EMITTING DIODE or ultrasonic transducer, among which the frequency divider, multiplexers and output buffers are integrated within an integrated circuit (IC) able to switch between ultrasonic and infrared carriers, and the integrated circuit provides two carrier signal output ports and two oscillation frequencies for the carrier. The frequency divider divides the oscillation frequency and feeds it to one input of the multiplexer which has the other input connected to the user controlled data. The output of the multiplexer is then sent out from the first carrier signal output port of the integrated circuit through the output buffer. The process involved in generation of the carrier signal from the second carrier signal output port of the integrated circuit is similar to that, only the phase of the carrier signal from the second port carrier signal output port of the integrated circuit is inverted to that of the carrier signal from the first carrier signal output port of the integrated circuit. As a result, the described ultrasonic and infrared transmitter does not need additional carrier generation circuitry in order for infrared and ultrasonic transmission, which makes it easier to integrate the transmitter circuit with an integrated circuit, and more convenient for the user to select infrared or ultrasonic transmission.

BRIEF DESCRIPTION OF THE DRAWINGS

For a better understanding of the present invention, reference may be had to the following description of exemplary embodiments thereof, considered in conjunction with the accompanying drawings, in which:

FIG. 5 shows the signal waveforms of the integrated circuit 20 able to switch between ultrasonic and infrared carriers.

DETAILED DESCRIPTION OF THE INVENTION

Figure 1:
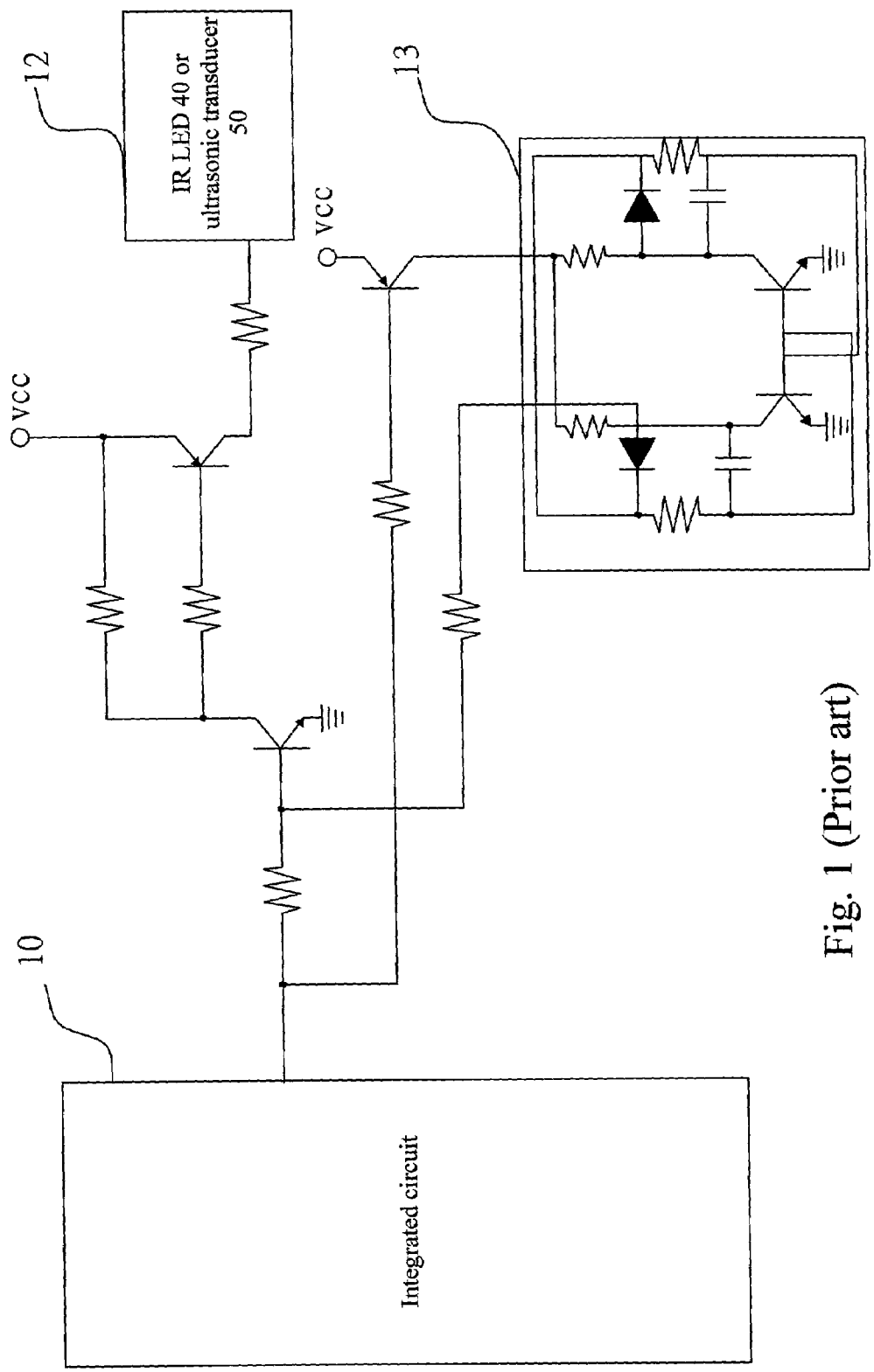
FIG. 1 shows the circuit diagram of a conventional infrared or ultrasonic carrier signal generation for transmission of signals from an integrated circuit.
Figure 2:
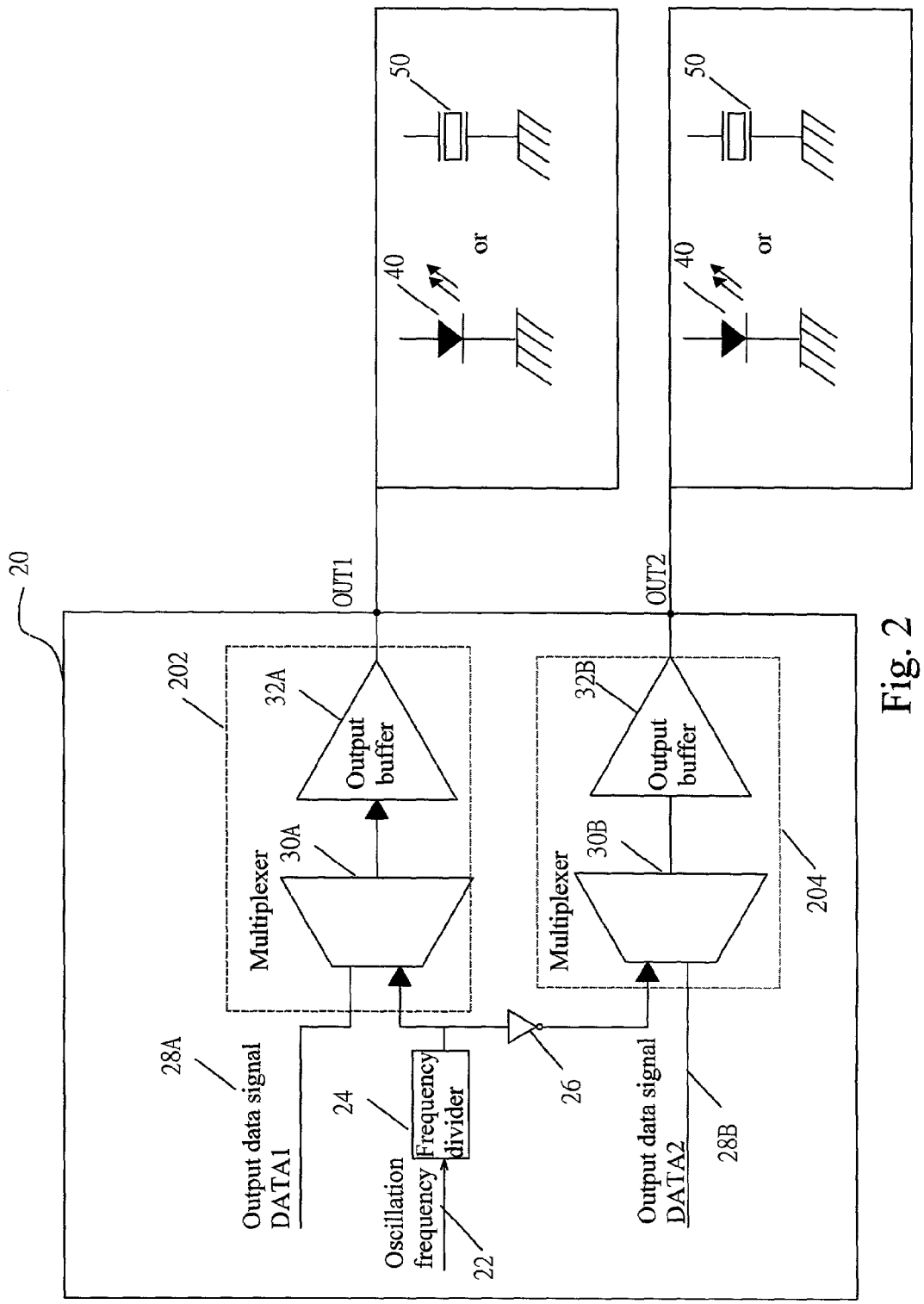
FIG. 2 is the circuit block diagram of one embodiment according to the present invention.

FIG. 2 shows the circuit block diagram of one embodiment according to the present invention, which comprises an integrated circuit 20 able to switch between ultrasonic and infrared carriers, and at least one set of infrared LIGHT EMITTING DIODE 40 or ultrasonic transducer 50. The integrated circuit 20 provides two carrier signal output ports OUT1 and OUT2 to output oscillating signals. Moreover, the integrated circuit 20 able to switch between ultrasonic and infrared carriers includes a frequency divider 24 where different divider can be set and circuit blocks 202 and 204. Carriers of different frequencies are obtained by dividing the oscillation frequency 22 by the frequency divider 24, and the circuit blocks 202 and 204 have the same architecture, which comprise multiplexers 30A and 30B, and output buffers 32A and 32B, respectively. The oscillation frequency 22 is divided by the frequency divider 24, then processed by the circuit block 202, and eventually outputted from the port OUT1. In the same manner, the oscillation frequency 22 is divided by the frequency divider 24, then processed by the circuit block 204, and eventually outputted from the port OUT2. For the first carrier signal output port OUT 1, the carrier signal it outputs is obtained through the process that the frequency divider 24 divides the oscillation frequency 22 to produce the desired carrier, for instance a continuous carrier, and feeds it to the multiplexer 30A which has the other input to accept the user controlled signal DATA1 28A, and the output of the multiplexer 30A is sent to the first carrier signal output port OUT1 through the output buffer 32A so as to transmit the DATA. The process for the second carrier signal output port OUT2 is similar to that for the first carrier signal output port OUT1, only that the oscillation frequency 22 divided by the frequency divider 24 is further inverted by the inverter 26 before it is connected to the circuit block 204, and thus the carrier signal from the second cater signal output port OUT2 has a phase opposite to that of the eater signal from the first carrier signal output port OUT1.

Figure 4:
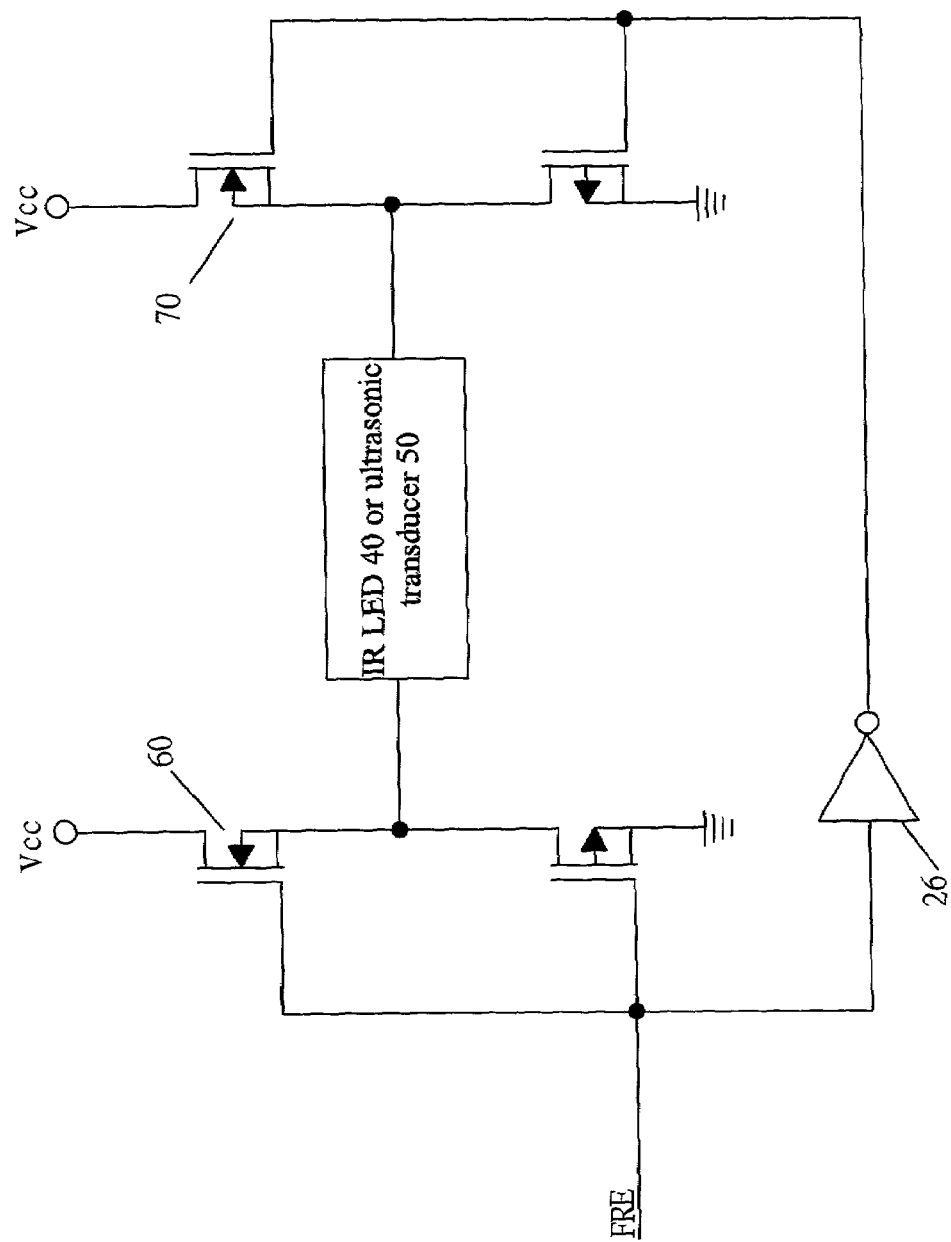
FIG. 4 a detail circuit schematic for implementation of another embodiment according to the present invention.

These two carrier signal output ports OUT1 and OUT2 can be connected respectively to the infrared LIGHT EMITTING DIODE 40 or ultrasonic transducer 50 for signal transmissions as shown in FIG. 2, or share the same infrared LIGHT EMITTING DIODE 40 or ultrasonic transducer 50 as shown in FIG. 4.

Figure 3:
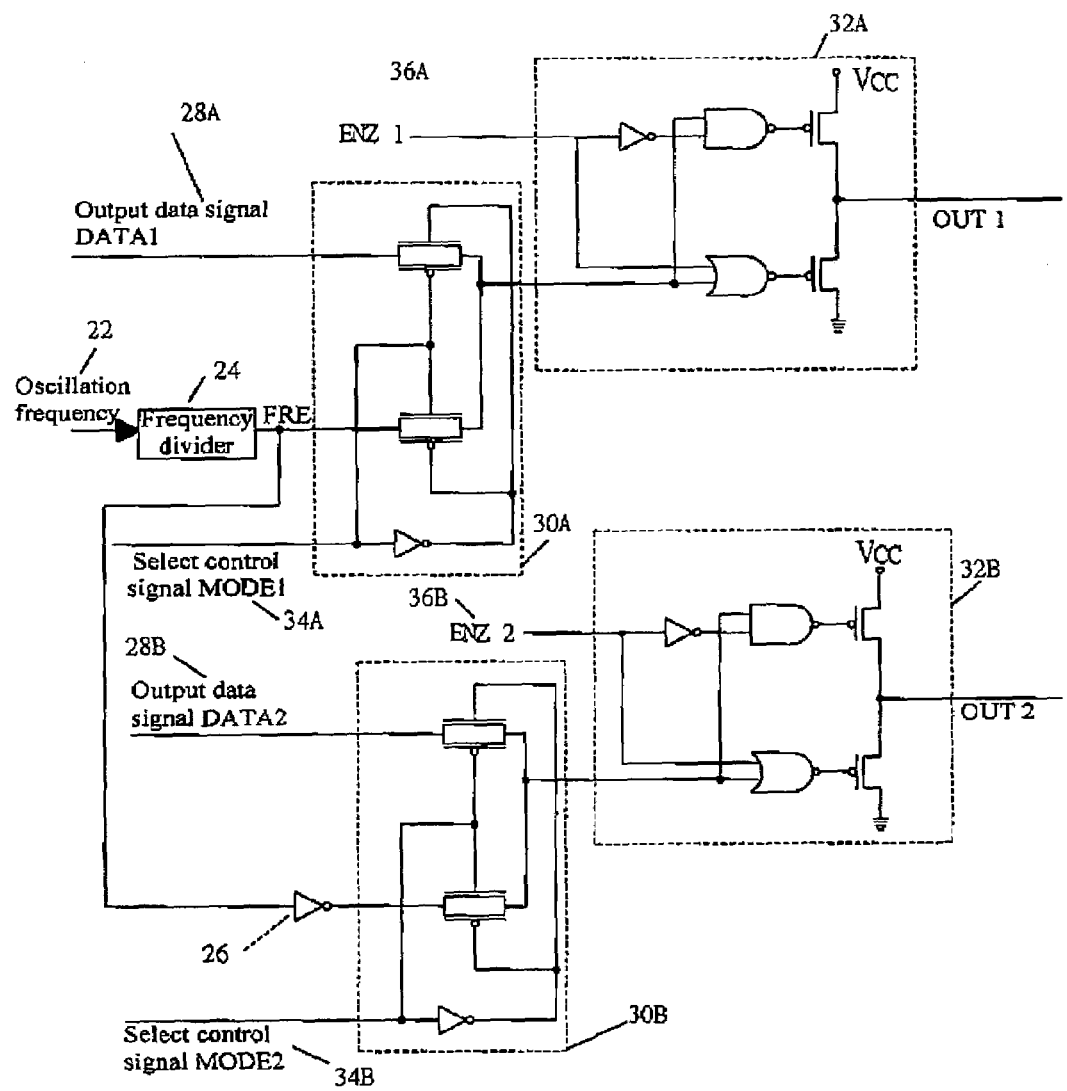
FIG. 3 is a detail circuit schematic for implementation of the embodiment according to the present invention.

FIG. 3 shows a detail circuit schematic for implementation of the above embodiment. The multiplexer 30A comprises crystal oscillators and controls the output by use of a select control signal MODE1 34A. When the select control signal MODE1 34A is 0, the multiplexer 30A outputs data signal DATA1 28A. On the contrary, when the select control signal MODE1 34A is 1, the multiplexer 30A outputs a carrier FRE from the frequency divider 24. The output buffer 32A includes a digital logic circuit and a push-pull output stage, it accepts the output from the multiplexer 30A and outputs that to the first output port OUT1 of the integrated circuit 20 able to switch between ultrasonic and infrared caters. When the enable signal ENZ1 36A is 0, the output buffer 32A is in normal state, and when the enable signal ENZ1 36A is 1, the output buffer 32A is turned off and serves an output impedance.

The multiplexer 30B controls the output by use of a select control signal MODE2 34B. When the select control signal MODE2 34B is 0, the multiplexer 24B outputs the data signal DATA2 28B. On the contrary, when the select control signal MODE2 34B is 1, the multiplexer 24B outputs the inverse of the carrier FRE from the frequency divider 24 in combination with the inverter 26. The output buffer 32B accepts the output from the multiplexer 24B and outputs that to the second output port OUT2 of the integrated circuit 20 able to switch between ultrasonic and infrared carriers. When the enable signal ENZ2 36B is 0, the output buffer 32B is in normal state, and when the enable signal ENZ2 36B is 1, the output buffer 32B is turned off and serves an output impedance.

A detail circuit schematic of another embodiment is shown in FIG. 4. The carrier FRE is fed to a push-pull output stage 60, while its inverse produced by the inverter 26 is fed to another push-pull output stage 70. Outputs from these two push-pull output stages 60 and 70 are connected to the infrared light emitting diode 40 or ultrasonic transducer 50 in a complementary fashion. Therefore, the carrier signal output ports OUT1 and OUT2 of the integrated circuit 20 able to switch between ultrasonic and infrared carriers can be connected to the same infrared light emitting diode 40 or ultrasonic transducer 50 to form a push-pull architecture to drive the infrared light emitting diode 40 or ultrasonic transducer 50.

FIG. 5 shows the signal waveforms of the integrated circuit 20 able to switch between ultrasonic and infrared carriers. In FIG. 5(A), when the select control signals MODE1 34A and MODE2 34B are fixed at 0, the two carrier signal output ports OUT1 and OUT2 of the integrated circuit 20 output binary signals and can be used as ordinary data ports. In FIG. 5(B), when the select control signal MODE1 34A is the carrier signal output and the data signals DATA1 28A and DATA2 28B are fixed at 0, the carrier signal output port OUT1 of the integrated circuit 20 outputs the carrier signal which can drive the infrared light emitting diode 40 or ultrasonic transducer 50. In FIG. 5(C), when the select control signal MODE2 34B is the carrier signal and the data signals DATA1 28A and DATA2 28B are fixed at 1, the carrier signal output port OUT2 of the integrated circuit 20 outputs the carrier signal which can drive the infrared light emitting diode 40 or ultrasonic transducer 50.

Therefore, the disclosed apparatus can generate carrier signals for the infrared light emitting diode or ultrasonic transducer, and ordinary input/output signals, it is hence versatile. The select control signals MODE1 34A and MODE2 34B, data signals DATA1 28A and DATA2 28B, as well as carrier FRE can be combined according to user's requirements. The frequency, magnitude and duty cycle of the carrier FRE can be adjusted according to various considerations such as transmission protocols for the infrared light emitting diode or ultrasonic transducer, or the characteristics of the circuit components, which makes it easy to codesign the ultrasonic transmitter circuit and the integrated circuit, resulting in improvement of productivity and lowered cost.

From the above, it should be understood that the embodiments described, in regard to the drawings, are merely exemplary and that a person skilled in the art may make variations and modifications to the shown embodiments without departing from the spirit and scope of the present invention. All variations and modifications are intended to be included within the scope of the present invention as defined in the appended claims.

What is claimed is:

1. An integrated circuit ultrasonic and infrared transmitter wit tunable carrier frequency comprising:
   a frequency divider for receiving an oscillation frequency and dividing said frequency to produce a carrier signal at an output thereof;
   a pair of multiplexers, a first of said multiplexers having a first output, a first input for receiving a first data signal, a second input coupled to said output of said frequency divider for receiving said carrier signal and a first control input for receiving a first select control signal, a second of said multiplexers having a second output, a third input for receiving a second data signal, a fourth input coupled to said output of said frequency divider through an inverter for receiving an inverse of said carrier signal and a second control input for receiving a second select control signal, said first multiplexer outputting one of said first data signal and said carrier signal to said first output responsive to said first select control signal, said second multiplexer outputting one of said second data signal and said inverse carrier signal to said second output responsive to said second select control signal;
   a pair of output buffers having inputs respectively connected to said first and second outputs of said pair of multiplexers for providing a push-pull output between respective outputs of said output buffers; and,
   a transmitting element coupled between said outputs of said output buffers.

2. An integrated circuit ultrasonic and infrared transmitter according to claim 1, wherein said transmitting element is one of an ultrasonic transducer or an infrared light emitting diode.

* * * * *